United States Patent [19]

Sweeney et al.

[11] 3,921,586
[45] Nov. 25, 1975

[54] CROWD GATE FOR MILKING PARLOR HOLDING AREAS

[75] Inventors: Raymond G. Sweeney, Walworth, Wis.; Michael M. Thyberg, Bismarck, N. Dak.

[73] Assignee: Chromalloy American Corporation, New York, N.Y.

[22] Filed: Aug. 1, 1974

[21] Appl. No.: 493,823

[52] U.S. Cl. ............................... 119/20; 119/14.04
[51] Int. Cl.² ............................................ A01K 1/02
[58] Field of Search ......... 119/20, 14.03, 14.04, 27; 49/197, 199, 200, 331, 332

[56] References Cited
UNITED STATES PATENTS

| | | | |
|---|---|---|---|
| 3,703,884 | 11/1972 | Maddalena et al. | 119/27 |
| 3,805,741 | 4/1974 | Thompson et al. | 119/20 |

*Primary Examiner*—Louis G. Mancene
*Assistant Examiner*—Peter K. Skiff
*Attorney, Agent, or Firm*—Wegner, Stellman, McCord, Wiles & Wood

[57] ABSTRACT

A carriage mounted, horizontally pivoted, crowd gate for a milking parlor holding area in which cattle are admitted through an entry end of the holding area which is opposite the exit to the milking parlor. An overhead cable which is connected to the top of the gate for moving the gate from end to end of the holding area carries a lifting cable which is secured to the drive cable a short distance from the gate toward the entry end, and which is secured to the bottom of the gate. By blocking the carriage while continuing to operate the drive cable toward the entry end the lifting cable is pulled to swing the gate up on its pivots, after which a lug on the cable strikes a limit switch to stop the gate drive. Opposite movement of the drive cable slacks the lifting cable so the gate returns to vertical position.

13 Claims, 5 Drawing Figures

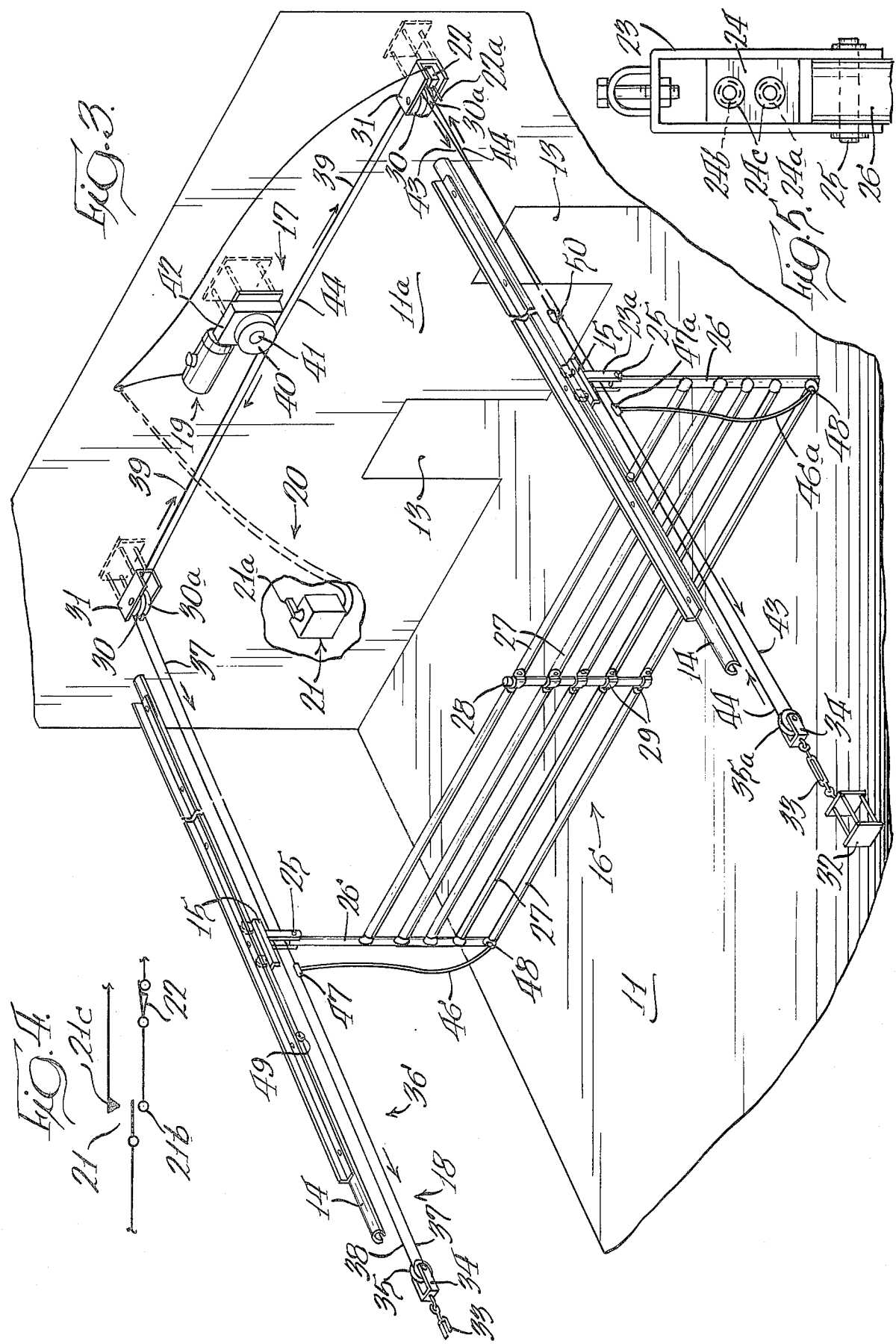

CROWD GATE FOR MILKING PARLOR HOLDING AREAS

BACKGROUND OF THE INVENTION

Modern dairy farm operations which involve the handling of relatively large dairy herds must be managed with a minimum of manpower in order to maximize their profitability. A major development in dairy farm operation is the use of milking parlors which permit one man to handle the milking of several animals at a time. In order to expedite the movement of the animals into and through the milking parlor, it has become common practice to use a holding area to which several cows are admitted and from which they enter the milking parlor under the control of the operator.

One or two balky cows in the holding area can delay the operation, and crowd gates have been developed which can be moved from the entrance end of the holding area to the exit end at the milking parlor, with the operator controlling the movement of the crowd gate from the milking parlor to urge the cattle forwardly in the holding area and then into the milking parlor. Patents which show crowd gates in dairy farm operation include Gribble et al. U.S. Pat. No. 3,223,070, Fullerton et al. U.S. Pat. No. 3,799,115, and Thompson et al. U.S. Pat. No. 3,805,741. U.S. Department of Agriculture Miscellaneous Publication No. 1197, issued July 1971 (Cooperative Farm Building Plan Exchange Plan No. 6092) illustrates two types of electrically operated crowd gates for dairy cattle.

In addition, Czechoslovakian Pat. No. 110,525 discloses a crowd gate used in the handling of hogs; and McIver et al. U.S. Pat. No. 409,222 discloses a gangway for loading or unloading stock-cars which is equipped with a crowd gate.

The layout of a milking parlor holding area determines whether or not a crowd gate must be arranged to swing upwardly to a horizontal position, and also whether it must be arranged to swing up adjacent the exit end of the holding area or only adjacent the entry end. Thus, for example, a holding area to which cattle are admitted from the side can be equiped with a crowd gate that need not swing up, because it can be moved to the end of the holding area remote from the milking parlor and the cows can then be admitted to the holding area in front of it. On the other hand, if the holding area entrance is in the end wall opposite the exit to the milking parlor the crowd gate must be swung to horizontal position adjacent the entrance end to permit a group of cows to enter the holding area, after which the crowd gate may be returned to a vertical position behind them. In a relatively small number of installations where there is no way of controlling entry of cattle to the holding area it is necessary to elevate the crowd gate adjacent the exit end so that it may be moved rearwardly over them and then lowered behind them. However, in the great majority of milking parlor holding area layouts this is not necessary.

The necessity for swinging the gate up to admit cows to the holding area substantially increases the cost of constructing a milking parlor-holding area layout which can be entirely controlled by the operator without leaving the milking parlor. U.S. Pat. No. 3,805,741, previously mentioned, has a relatively complex and correspondingly expensive arrangement which has one motor for driving the gate and a separate motor driven winch which winds up a cable to raise the gate. Cain U.S. Pat. Nos. 2,092,440 and 3,282,250 and Page et al., U.S. Pat. No. 3,460,515, all disclose milking systems in which cows pass through various stations on a conveyor belt type of arrangement upon which they are confined by a series of gates. As each gate reaches a point at which a cow is to be released, it is elevated by the drive mechanism to release the cow and is then returned to the starting position where it is lowered behind another cow.

SUMMARY OF THE INVENTION

The present invention provides a very simple and inexpensive means of raising a crowd gate adjacent the entry end of the cattle holding area of a milking parlor.

The crowd gate is moved by an overhead cable system which is connected to the two ends of the gate through connecting cables which are connected to the overhead cable toward the entrance end of the holding area from the pivot axis of the gate and are also connected to the bottom of the gate. When the gate is spaced from the entrance end of the holding area by a distance slightly greater than its height the gate carriages are blocked against further movement so that continued operation of the overhead cables acts through the connecting cables to raise the gate. The cable drive is stopped by a lug on the overhead cable which contacts a limit switch to open the control circuit for the cable drive motor.

When the drive is started to move the crowd gate toward the milking parlor, the initial movement of the cables relieves the pull on the connecting cables to permit the gate to swing to its vertical position, after which the cable drive begins to move the crowd gate forward in the holding area.

In addition to the simple and inexpensive gate lifting means, the gate drive control for the operator in the milking parlor consists of a simple three position toggle switch with a center position in which the cable drive motor control circuit is open. When the toggle switch is moved to a first offset position, it closes the control circuit to cause the motor to dive the gate toward the entry end of the holding area, and the toggle switch remains in that position. The closed switch contacts are in series with the limit switch which stops the gate drive after the gate is elevated. Movement of the toggle switch to a second off-center position closes the control circuit to cause the motor to drive the gate toward the milking parlor; and on that side the toggle switch is of the momentary contact type which must be manually held by the operator in order to keep the gate moving. This permits the operator to maintain complete control over gate operation as the gate crowds the cattle in the holding area toward the milking parlor. This eliminates the relatively complex and expensive system of Pat. No. 3,805,741 which teaches what might be called an automatic nudging gate.

THE DRAWINGS

FIG. 3 is a fragmentary perspective view of the crowd gate system of the present invention;

FIG. 4 is a fragmentary electrical control circuit diagram; and

FIG. 5 is a fragmentary sectional view on an enlarged scale taken substantially as indicated along the line 5—5 of FIG. 2.

DETAILED DESCRIPTION OF THE INVENTION

Figure 1:
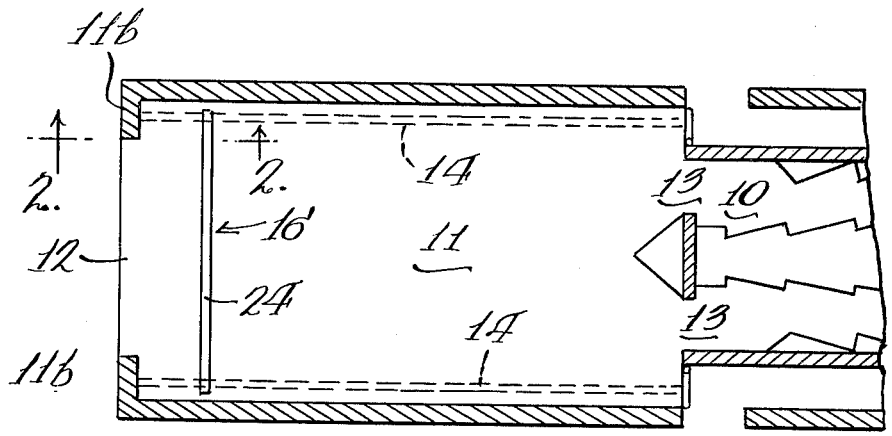
FIG. 1 is a fragmentary, diagrammatic plan sectional view of a milking parlor and milking parlor holding area provided with a crowd gate.

Referring to FIG. 1, a milking parlor, indicated generally at 10, is provided with a holding area, indicated generally at 11, which has one end provided with an entrance 12 for cattle and the other end provided with exits 13 to the milking parlor. Referring now particularly to FIG. 3, a pair of overhead tracks 14 which extend from end to end of the holding area carry wheeled carriages 15 upon which a crowd gate, indicated generally at 16, is mounted for movement between the entrance end 12 and the exits 13 of the holding area 11. Drive means, indicated generally at 17, includes an overhead cable system, indicated generally at 18, and a reversible electric motor, indicated generally at 19. An electrical control circuit, indicated generally at 20, includes a manual control box, indicated generally at 21, which is mounted at a convenient location in the milking parlor 10. The control circuit 20 also includes a normally closed switch 22.

Figure 2:
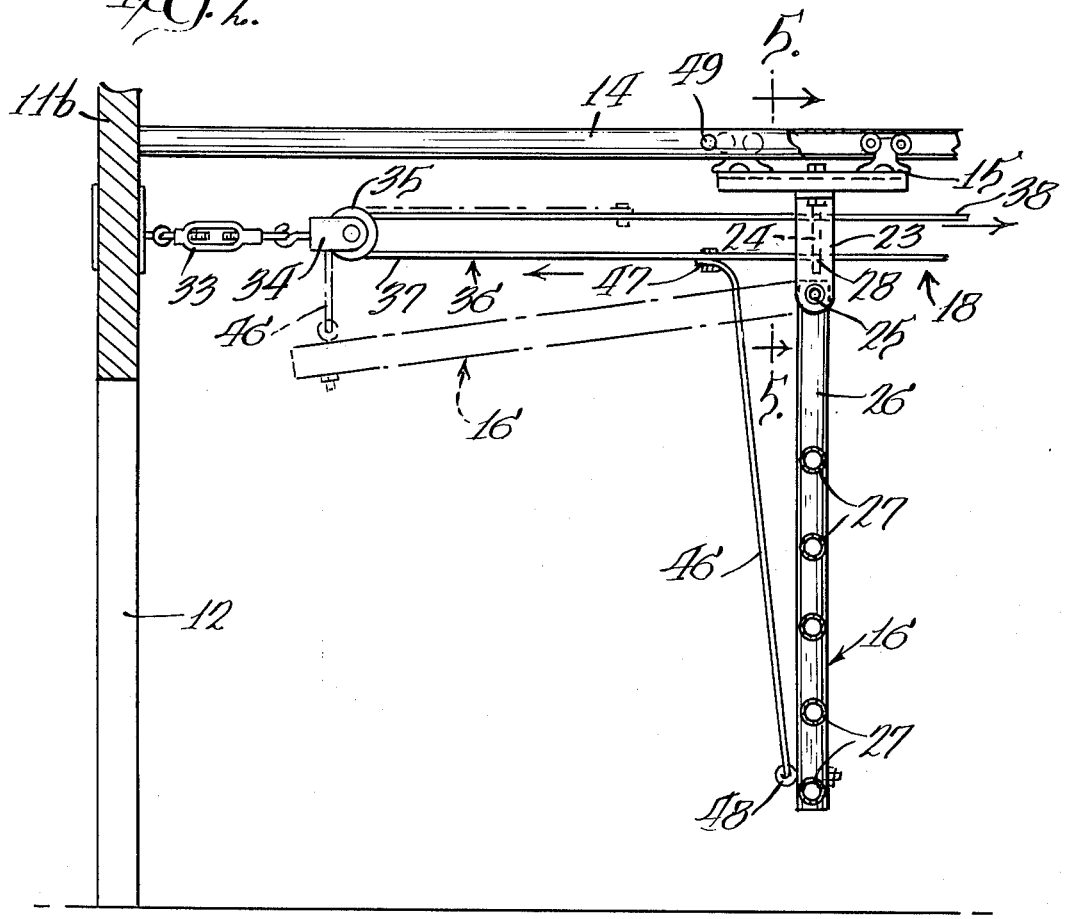
FIG. 2 is a fragmentary sectional view on an enlarged scale with a crowd gate in accordance with the present invention illustrated in full lines in its vertical, operative position and in broken lines in its elevated position, FIG. 2 being taken substantially as indicated along the line 2—2 of FIG. 1.

Referring particularly to FIG. 3, the overhead tracks 14 are of the split tubular type used for hanging sliding barn doors, and the carriages 15 carry brackets 23 and 23a, at the left and right, respectively, as viewed in FIG. 3, which are of a deep channel shape provided with cross webs such as the web 24 in FIG. 5. The webs have holes 24 and 24b provided with plastic grommets 24c. Aligned horizontal pivots 25 at the lower ends of the brackets 23 and 23a support the crowd gate 16 for pivotal movement as illustrated in FIG. 2.

While the crowd gate may be constructed of any desirable rigid material, it is illustrated in the drawings as consisting of end uprights 26 of galvanized pipe, cross bars 27, also of galvanized pipe, and a center upright 28 which is connected to the cross bars 27 by brackets 29. As best seen in FIG. 1, the crowd gate 16 is wide enough that cattle cannot pass between its ends and the side walls of the holding area 11.

As best seen in FIG. 3, the overhead cable means 18 of the drive means 17 includes fixed sets of corner sheaves 30 and 30a which are journalled in brackets 31 that are mounted on an exit end wall 11a of the holding area 11 immediately beneath the overhead tracks 14; and on an entrance end wall 11b of the holding area are brackets such as the bracket 32 in FIG. 3 to which are connected turn buckles 33 having yokes 34 in which single tensioning sheaves 35 and 35a are journalled. An endless cable, indicated generally at 36, runs freely with respect to the gate 16. It has a lower run 37 which is to the left in FIG. 3 and extends freely through the lower hole 24a of the bracket web 24, thence around the sheave 35 from bottom to top, and a left hand upper, or return run 38 passes freely through the upper hole 24b in web 24, around the upper sheave 30 of the left hand pair of fixed sheaves 30 and 30a, and becomes a drive run 39 which is wrapped three times around a capstan 40 which is keyed on an output shaft 41 of a gear box 42 that is driven by the motor 19. The cable drive run passes around the upper sheave 30 of the right hand sheave set 30 and 30a, and in a longitudinal right hand run 43 the cable passes freely through the lower hole in the cross web of the right hand bracket 23a, thence around the right hand tensioning sheave 35a from bottom to top, and makes a return run 44 which passes freely through a plastic grommet in the upper hole in the cross web of the bracket 23a, around the right hand lower sheave 30a, becomes a transverse run 45 to the left hand lower sheave 30a, and becomes the left hand lower run 37. Thus the right hand runs 43 and 44 cross, so the left and right hand lower runs between the brackets 23 and 23a and the tensioning sheaves 35 and 35a both move in the same direction. The various arrows alongside the cable runs on FIG. 3 indicate the direction of movement of the various runs when the crowd gate 16 is being returned to the entry end of the holding area 11. 46a The gate is moved by the overhead cable means and is also raised from the full line operative position of FIG. 2 to the broken line elevated position of FIG. 2 through a pair of connecting cables 46 and 46a and by connectors in the form of cable clamps 47 to the lower left hand cable run 37 and to the right hand cable run 43, respectively, between the gate and the tensioning sheaves 35 and 35a, respectively. Each of the connecting cables 46 and 46a has its lower end connected to an eye 48 which is at the bottom of the gate, and as seen in FIG. 3 the connecting cables have some slack so that, for example, when the cable clamps 47 and 47a are approximately 8 inches from the pivot axis of the gate the lifting cables are taut as seen in FIG. 2. When the overhead cable is moving as indicated by the arrows in FIGS. 2 and 3, it actually moves the gate toward the entrance wall 11b only through the connecting cables.

The overhead tracks 14 are provided with blocking members, such as the member 49 which is seen in the left hand track 14 in FIG. 3, and the blocking members may conveniently take the form of threaded bolts which impale the track to block the travel of the carriages 15. The blocking members 49 are spaced from the entrance end wall 11b of the holding area by a distance which is approximately 6 inches greater than the height of the gate from the pivots 25 to the lowermost cross bar 27. When the overhead cable 36 is moving in the direction of the arrows in FIGS. 2 and 3 and the carriages 15 are blocked by the blocking means 49, continued movement of the overhead cables 36 causes the connecting cables 46 to swing the gate 16 upwardly to the broken line position of FIG. 2.

As previously stated, the motor control circuit 20 includes a three-position toggle switch 21 and a limit switch 22. The toggle switch includes an operating lever 21a which has a center position in which a set of contacts which include the contact 21b and also a set of contacts which include the contact 21c (FIG. 4) are open so the control circuit is deenergized and so is the motor 19. When the toggle lever 21a is moved to a first offset position it closes the control circuit through the contact 21b to cause the motor 19 to drive the crowd gate 16 toward the entrance wall 11b of the holding area. As indicated by FIG. 4, the first offset position of the toggle switch is one in which the contacts remain closed without maintaining manual pressure upon the toggle lever 21a. Accordingly, the motor continues to drive the crowd gate 16 toward the entrance wall 11b until the limit switch 22 is opened to break the motor control circuit and stop the motor. This occurs when a button 50 on the right hand return cable run 44 strikes an actuator 22a of the limit switch 22 to open said limit switch and break the control circuit to stop the motor 19. The button 50 on the cable is so positioned that it strikes the manual limit switch actuator 22a when the crowd gate 16 is in the broken line position of FIG. 2.

In order to energize the motor 19 so as to drive the crowd gate toward the milking parlor entrances 13, the manual lever 21a is moved to a second offset position in which it closes the motor control circuit through the momentary contact 21c. The toggle switch operating lever 21a remains in the latter position only as long as manual pressure on the switch lever is maintained. This permits an operator in the milking parlor to completely control movement of the crowd gate 16 to urge, or crowd cattle toward the milking parlor entrances 13. When the circuit is first closed through the contact 21c to energize the motor 19 the drive of the cable runs 38 and 43 toward the milking parlor first serves to release the pull on the connecting cables 46 and 46a so the crowd gate 16 may return to its vertical position. As the cable continues to move in the same direction, cable clamps 47 and 47a abut the bracket webs 24 to move the gate toward the milking parlor at a relatively slow speed. A gate travel speed of about 90 feet per minute is suitable. The gate travel is permitted to continue until the gate encounters the rearmost cow in the holding area and begins to swing about its pivots 25. The operator then releases the switch lever 21a to stop the motor, and only resumes operation of the motor when it is again necessary to crowd the cows forward in the holding area.

The foregoing detailed description is given for clearness of understanding only and to unnecessary limitations should be understood therefrom, as modifications will be obvious to those skilled in the art.

We claim:

1. Crowd gate means for a cattle holding area which has an entry at one end and an exit to a milking parlor at the opposite end, said crowd gate means comprising, in combination:

parallel overhead tracks extending from end to end of the holding area;

carriages supported on said tracks, said carriages having brackets;

a gate pivotally suspended on said brackets on a horizontal axis, said gate being substantially the width of the holding area;

drive means including an overhead cable for moving said gate from end to end of the holding area and a reversible electric motor drivingly connected to the overhead cable;

an electric control circuit including first switch means having first open contacts, and means for closing said first open contacts to cause the motor to drive the gate toward the entry end of the holding area;

connecting cable means which has one end connected to the overhead cable between the gate and the entry end of the holding area, the other end of said connecting cable means being connected toward the bottom of the gate;

blocking means for blocking movement of the carriages toward the entry end, said blocking means being spaced from the entry end by a distance which is slightly greater than the distance from the pivot axis to the bottom of the gate, whereby when movement of the carriages is blocked the overhead cable continues to move and pulls the connecting cable to pivot the gate upwardly toward the entry end;

means for stopping the drive of the overhead cable when the leading end of the lifted gate is near the entry end of the holding area;

and second switch means in the control circuit having second open contacts, and means for closing said second open contacts to cause the motor to drive the overhead cable for moving the gate toward the exit end of the holding area, initial movement of the overhead cable toward said exit end releasing the pull on the connecting cable means so the gate returns to an upright position.

2. The combination of claim 1 in which the carriage brackets have transverse webs with holes through which the overhead cable means runs freely, the connecting cable means is connected to the overhead cable means by connectors which are larger than said holes, the overhead cable means is connected to the gate only by the connecting cable means through which the overhead cable means moves the gate toward the entry end of the holding area, and the connectors contact said webs to move the gate toward the exit end of the holding area.

3. The combination of claim 1 in which the means to stop the drive of the overhead cable includes a normally closed switch in series with the open contacts of said first switch means, and switch control means for actuating said normally closed switch when the leading end of the lifted gate is immediately adjacent the entry end of the holding area.

4. The combination of claim 3 in which the normally closed switch is a limit switch provided with a mechanical actuator and the switch control means is on a movable part of the crowd gate means where it contacts said mechanical actuator.

5. The combination of claim 4 in which the mechanical actuator is immediately adjacent the overhead cable, and the switch control means is a button on the cable.

6. The combination of claim 3 in which the means for closing the first open contacts includes a manual actuator.

7. The combination of claim 6 in which the means for closing the second open contacts includes a manual actuator.

8. The combination of claim 7 in which the first and second switch means comprises a three position manual toggle switch having a center position in which the contacts of both said manual switch means are open, a first off-center position in which the open contacts of the first switch means are closed, and a second off-center position in which the open contacts of the second switch means are closed.

9. The combination of claim 8 in which the manual toggle switch locks in the first off-center position and is spring loaded from the second off-center position.

10. The combination of claim 1 in which the means for closing the first open contacts includes a manual actuator.

11. The combination of claim 10 in which the means for closing the second open contacts includes a manual actuator.

12. The combination of claim 11 in which the first and second switch means comprises a three position manual toggle switch having a center position in which the contacts of both said manual switch means are open, a first off-center position in which the open contacts of the first switch means are closed, and a second off-center position in which the open contacts of the second switch means are closed.

13. The combination of claim 12 in which the manual toggle switch locks in the first off-center position and is spring loaded from the second off-center position.

* * * * *